United States Patent [19]
Hirth et al.

[11] Patent Number: 4,723,275
[45] Date of Patent: Feb. 2, 1988

[54] CIRCUIT ARRANGEMENT FOR GENERATING AN ACOUSTIC RINGING SIGNAL IN A SUBSCRIBER TELEPHONE SET

[75] Inventors: Peter Hirth, Erlangen; Werner Frerichs, Eckental/Forth; Hubert Grucza, Nuremberg, all of Fed. Rep. of Germany

[73] Assignee: U.S. Philips Corporation, New York, N.Y.

[21] Appl. No.: 826,175

[22] Filed: Feb. 5, 1986

[30] Foreign Application Priority Data

Feb. 8, 1985 [DE] Fed. Rep. of Germany ....... 3504243

[51] Int. Cl.$^4$ ............................................. H04M 1/26
[52] U.S. Cl. .................................... 379/361; 379/375
[58] Field of Search .............. 179/81 R, 84 T, 84 VF, 179/84 R; 379/352, 360, 361, 362, 373, 374, 375, 376, 387

[56] References Cited

U.S. PATENT DOCUMENTS

| | | | |
|---|---|---|---|
| 4,491,691 | 1/1985 | Embree et al. | 179/84 R |
| 4,571,462 | 2/1986 | Janssen | 179/81 R |

FOREIGN PATENT DOCUMENTS

| | | | |
|---|---|---|---|
| 2037128 | 7/1980 | United Kingdom | 179/81 R |

OTHER PUBLICATIONS

All Telephone Functions in One Chip PBL3780, Bengt Berg, #No. 3, 1985, Ericsson Review.
LSI for Telecommunications, David W. Pace, Apr. 1984, Telecommunications North American Edition.

*Primary Examiner*—James L. Dwyer
*Attorney, Agent, or Firm*—Thomas A. Briody; Jack Oisher; William J. Streeter

[57] ABSTRACT

A subscriber telephone set which comprises a multifrequency dialing tone oscillator, a microprocessor connected thereto for controlling selection of the tones produced thereby, and an acoustic signal element for producing a ringing sound corresponding to ringing tones applied thereto. The microprocessor prevents incorrect triggering of the acoustic signal element by noise voltages on the subscriber line by verifying that the amplitude of the ringing current received on the line exceeds a predetermined level, and also that the ringing current frequency corresponds to the frequency of a resetting signal internally generated within the microprocessor. Upon such verification, the microprocessor controls the dialing tone oscillator to generate a ringing tone which is applied to the acoustic signal element to cause it to generate a ringing sound, the dialing tone oscillator thereby also serving as a ringing tone generator for activating the acoustic signal element.

4 Claims, 1 Drawing Figure

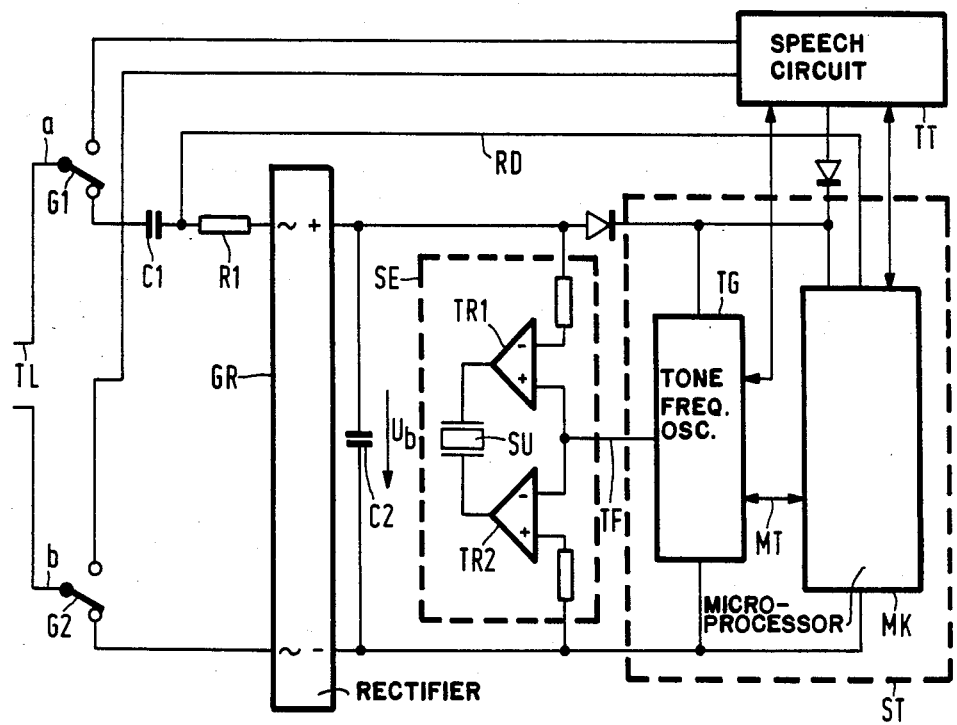

CIRCUIT ARRANGEMENT FOR GENERATING AN ACOUSTIC RINGING SIGNAL IN A SUBSCRIBER TELEPHONE SET

BACKGROUND OF THE INVENTION

1. Field of the Invention

The invention relates to a circuit arrangement for producing an acoustic ringing signal in subscriber end stations of telecommunication arrangements in which the subscriber end stations are called from the exchange by superposing a ringing a.c. voltage on the d.c. supply voltage on the subscriber line.

2. Description of the Related Art

In telecommunication apparatus with alternating current bells, the ringing a.c. voltage which, in Germany, for example, may have a frequency of 25 Hz, is applied to the alternating current bell through a capacitor. When the hand-set is lifted by the subscriber, then by means of the hook switch the loop is closed over the subscriber line, the flow of the loop direct current is detected in the exchange, and the ringing alternating current is switched off.

In contemporary telephone sets, an electronic circuit is used to produce the acoustic ringing signal instead of the alternating current bell. The rectified ringing a.c. voltage is used to operate the electronic circuit. In the most simple case a rectifier is provided for this purpose, which is followed by a filter capacitor. The d.c. voltage thus generated is used to supply an electronic oscillator which in its turn controls a loud-speaker for sound reproduction.

Elektronik 1/15.01.1982, pages 53 to 58 "Microcomputer gesteuerter Tastwahl-Fernsprchapparat mit Flussigkristallanzeige", by Joachim Hollmann, discloses a telephone set with push button dial, comprising an electronic tone ringing circuit (tone ringing IC) for producing the acoustic ringing signal. The tone ringing-IC produces three frequencies: 800, 1067 and 1333 Hz, which are cyclically applied to a loudspeaker. The cyclic frequency and the volume can be adjusted by the subscriber. In addition to the tone ringing circuit the push-button dial telephone set comprises a dialing selection unit and a speech circuit. Control of the selection unit in accordance with the dialing information applied by the key board is provided by a microcomputer which also controls indicator arrangements and memory arrangements for storing call numbers or such like. If the dialing characters are produced in accordance with the multi-frequency method then the push button dial-telephone set comprises also an integrated circuit which is controlled by the key-board, and, each time a button is depressed, generates the two frequencies (line and row frequencies) which are transmitted to the exchange over the subscriber's line. The above-mentioned circuit arrangement always comprises separate IC's with associated quartz or ceramic resonator, respectively, for producing the frequencies of the multifrequency dialing method and for the acoustic ringing signal.

DE-AS No. 28 16 782 discloses a circuit arrangement for producing an acoustic ringing signal in subscriber stations of tele communication systems. The subscriber terminal includes a rectifier arrangement which, by rectifying the ringing alternating current applied to the subscribers line, generates the supply voltage for a switching arrangement (tone calling circuit), a tone-frequency oscillator (multivibrators) and an acoustic signal element (piezo-electric transcucer). So as to keep the power requirements for the circuit arrangement as low as possible, a piezo-electric transducer is connected by a switching device to either the supply potential or the ground reference potential potential. The frequencies produced by the multivibrator control the switching device, switching between two other frequencies being effected at a rate determined by one of the frequencies. This known circuit arrangement indeed requires only an inexpensive and simple circuit in the subscriber terminal but it has the disadvantage that the acoustic ringing signal may be triggered by noise voltages.

In the international application having the German file number P 3049811.4, corresponding to U.S. Pat. No. 4,276,448 an electronic tone ringer is disclosed which includes a sensor (tone calling circuit) for distinguishing between valid and invalid call signals and in which the tone calling circuit controls an oscillator-generator having a frequency-determining arrangement (tone-frequency oscillator) and an output circuit with electro-acoustic transducer (acoustic signal element). The tone calling circuit disclosed therein has the disadvantage that the circuit it requires in the subscribers terminal is very expensive and complicated.

SUMMARY OF THE INVENTION

The invention has for its object to provide a a very inexpensive and simple circuit arrangement which prevents to a very large extent incorrect triggering of an acoustic all signal in response to noise voltages on the subscriber line.

The invention is based on the recognition that the functions of the tone calling circuit can be performed by arrangements already present in the subscriber's end station. Thus, the microprocessor conventionally comprised in push-button dialing sets and controlling in known manner indicators, selector units, memory units in dependence on a control function incorporated in the key board, and the oscillator used for generating multifrequency encoded dialing characters, can be utilized. The calculating time required for distinguishing between valid and invalid ringing signals and for controlling the tone-frequency oscillator is very short, and can be performed without any further measures by commercially available microprocessors commonly used in dial tone multifrequency telephone sets.

To distinguish between valid and invalid ringing signals, the microprocessor verifies both the amplitude of the applied ringing a.c. voltage and detection of the frequency. As a result thereof not only inopportune triggering in response to noise voltages will be prevented to a very large extent, but also the selectivity at voltage peaks will improve. The amplitude detection may be effected by means of a comparator circuit or a resetting circuit.

The circuit arrangement is of a simple construction, is inexpensive and requires only little design effort.

BRIEF DESCRIPTION OF THE DRAWING

The invention will now be described in greater detail with reference to the circuit embodiment thereof shown in the single accompanying drawing.

DESCRIPTION OF THE PREFERRED EMBODIMENTS

With the aid of a rectifier arrangement GR in the subscribers end station, a direct supply voltage $U_b$ is produced from the ringing alternating current supplied over the subscribers line TL, by recifying this ringing alternating current. To that end, the ringing a.c. voltage is applied via the wires a, b, the hook-switch contacts G1, G2, and a series arrangement formed by a capaitor C1 and a resistor R1 to an a.c. voltage input of the rectifier arrangment GR. The supply voltage $U_b$ produced by the rectifier arrangement GR is applied to a filter capacitor C2, an acoustic signal element SE, and by diodes to the control portion ST of the telephone set. Control portion ST comprises a microprocessor MK and a tone-frequency oscillator TG. In the off-hook or speech condition, the control portion ST is fed from the speech circuit portion TT of the telephone set. The microprocessor MK is connected by a first line RD to a terminal of the capacitor C1 and by a second line MT to the tone-frequency oscillator TG. The tone-frequency oscillator TG is connected to the acoustic signal element SE by a third line TF. The acoustic signal element SE comprises driver circuits TR1, TR2 and a subsequent piezo-electric transducer SU.

The series arangement formed by C1 and R1 is used for separating the direct current from the supply direct current and for limiting the amplitude of the applied ringing alternating current.

If now a ringing a.c. voltage is applied to the wires a, b, then the microprocessor MK, when the supply voltage $U_b$ of the rectifier arrangement GR has reached a predetermined level, produces internally a resetting signal and starts to measure the frequency of the ringing signal applied via the first line RD. If the measure ringing signal frequency agrees with the reset signal frequency (25 Hz or 50 Hz), then the tone-frequency oscillator TG is driven by microprocessor MK over the second line MT and the acoustic signal element SE is switched on. The ringing tone frequency sequence is also controlled by microprocessor MK.

Thus, the microprocessor MK actually performs three functions. First, evaluating the amplitude of the applied ringing a.c. voltage to prevent to a very large extent incorrect noise-voltage responsive triggering of an acoustic ringing signal, secondly a frequency detection in order to improve the selection at voltage peaks, and thirdly control of the production of the ringing tone sequence.

In addition to the indirect evaluation of ringing signal amplitude as already described by evaluating the level of the rectified supply voltage $U_b$, the evaluation of the amplitude may alternatively be effected directly by comparing, using a comparator circuit, the amplitude of the ringing a.c. voltage applied over the first line RD with a preset level. The microprocessor MK can effect the frequency evaluation in the same manner as a counter discriminator.

Commercially available modules which can produce the required frequencies under the control of a processor may be used as the tone-frequency oscillator.

It has been found to be advantageous for detecting the amplitude of the ringing signal during the detection procedure, to connect a basic load to the rectifier arrangement GR. If this basic load is chosen such that it corresponds to the load caused by the acoustic signal element SE, then by removing this basic load when the piezo-electric transcucer SU is switched on the supply voltage $U_b$ is prevented from breaking down below the switching value at that instant, and the ringing signal from being switched off again.

This basic load may advantageously be imitated by the remaining speech circuit portion TT of the telephone set, it then being possible for this basic load to be switched off, for example, directly by the microprocessor MK.

What is claimed is:

1. In a subscriber telephone set for connection to a subscriber line over which alternating ringing current is supplied, such telephone set comprising means for rectifying such ringing current to derive a direct supply voltage therefrom, a multi-frequency dialing tone oscillator, and a microprocessor connected to the dialing tone oscillator for controlling selection of the tones produced thereby so as to provide programmable dialing operation of the telephone set, the rectified direct supply voltage being the supply voltage for the dialing tone oscillator and the microprocessor; the improvement characterized in that:

said telephone set comprises means for connecting said microprocessor to said subscriber line to receive the alternating ringing current therefrom, said microprocessor being adapted to verify whether the amplitude of the received ringing current exceeds a predetermined level, and, upon such verification, to further verify the frequency of such current by comparing such frequency with that of a resetting signal internally generated within said microprocessor;

said telephone set further comprises an acoustic signal element connected to the dialing tone oscillator, such acoustic signal element producing a ringing sound in response to an electrical ringing signal applied thereto;

said microprocessor controlling said dialing tone oscillator to cause it to generate such electrical ringing signal after said microprocessor has verified both the amplitude and the frequency of the received ringing current, such electrical ringing signal being applied by said dialing tone oscillator to said acoustic signal element so as to cause it to produce a ringing sound;

whereby besides producing dialing tones said dialing tone oscillator also produces ringing signals for actuating said acoustic signal element, and noise voltages on the subscriber line are prevented from causing said acoustic signal element to generate false ringing sounds.

2. An improved subscriber telephone set in accordance with claim 1, wherein said microprocessor verifies the amplitude of the received ringing current by comparing the rectified direct supply voltage derived therefrom with a threshold direct voltage corresponding to said predetermined level of the received ringing current.

3. An improved subscriber telephone set in accordance with claim 1, wherein said dialing tone oscillator and said microprocessor are comprised in a single integrated circuit.

4. An improved subscriber telephone set in accordance with claim 2 and which further comprises a speech circuit, said microprocessor connecting such speech circuit as a basic load across said rectifying means during verification of the amplitude of the received ringing current, said microprocessor disconnecting such speech circuit from said rectifying means following verification of the amplitude of the received ringing current; whereby the direct voltage derived from the received ringing current is prevented from dropping below said threshold direct voltage level when said electrical ringing signal is applied to said acoustic signal element.

* * * * *